BEST AVAILABLE COPY
E. Skinner,
Cook Stove.
8,889X
Patented June 12. 1835.
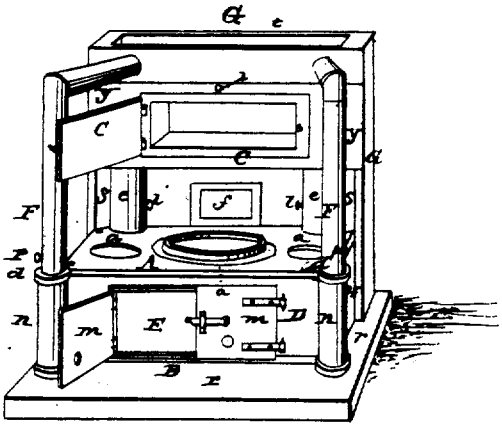
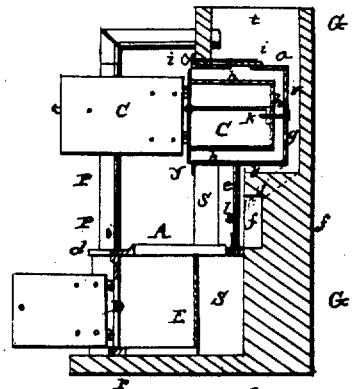
Transverse Section
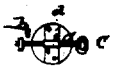
Damper
Fig. 3.
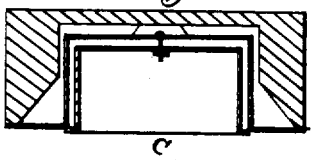
Fig. 1
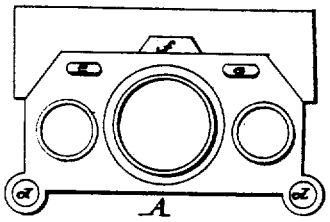
Fig. 2.
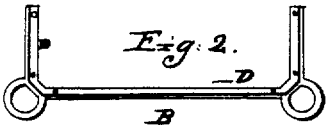
H. PETERS, PHOTO-LITHOGRAPHER, WASHINGTON, D. C.

8889X  June 12 1835  [illegible] 15  157

Elijah Skinner
Letters Patent

The Schedule referred to in these Letters Patent and making part of the same
containing a description in the words of the said Elijah Skinner himself of
his improvement in the cooking Stove.

---

To all to whom these presents may come Be it known that I Elijah
Skinner of Sandwich in the County of Strafford and State of New Hampshire
have invented a new and useful improvement in the cooking Stove. taken
from the oven and fender named in my specification of an improvement in
the mantle and fender of fire places in 1822. and from other cooking Stoves
and that the following I think is a full and exact description of said im-
provement as invented by me. First I make a plate of cast iron about two fifths of
the width of which is made with triangular corners to correspond with a com-
mon fire place and the residue is an oblong square from three to four feet in
length and from eighteen inches to two feet in width as may be required
according to the size of the stove. At the two front corners are circular project-
ing flues of any required size of the form of three quarters of a circle for funnels
as at d, d, No. 1 and near the back corners are ovating flues for funnels at
a & c No. 1. I also make in said plate the common openings for cooking ap-
paratus. I then make a cast iron plate or frame as at D. about two or three
inches wide and of the same form and compass as the front and ends of the afore-
said plate with round projecting corners. A part of the front of which is form-
ed into a door stool as at B. This latter plate is for the stove to rest upon
I then make another cast iron plate for the front of the stove the length of
which is calculated to extend as far as to the two projecting corners of the plate
first mentioned and from thirteen to fifteen inches or any required width
leaving a suitable opening for the doors. I next make two end plates of cast
iron of the same width and of sufficient length to extend from the front cir-
cular corners to the angles of the top plate which are fitted to the fire place as
aforesaid. I then make a sort of funnel of sheet iron for each front corner
about three fourths of a circle and equal in length to the width of the front plate

8889X plate with lips on each side of each forming such an angle as to correspond
with the front and end plates. And the circular parts to correspond with the first
mentioned flues. I then set my front and end plates and circular funnels into
a grooving prepared in the bottom plate or frame causing the lips of the funnels
to rest upon the front and end plates on the inside. I next place on my top
plate before described which is connected with the front end & funnels also by
grooving. I have also iron rods at the corners passing through the top and bot-
tom plates in such a position as to confine the corner funnels to the castings
by the lips aforesaid. And the whole is screwed together in common form.
I then make and hang in front two doors of any required size with apertures
and dampers in common form. I have also apertures and dampers in the end
to let in the air when required and in some cases a door in one end. Rims are
made for the boilers or they are fitted to the stove as in other cooking stoves. I
then place on the corner flues in front my funnels extending upward and enter-
ing the chimney or passing off in any required direction with a damper in
each near the bottom. On the first mentioned back flues I fit two ovaling
funnels from fourteen to eighteen inches in length usually with a damper
in each near the bottom. The dampers are all made and fitted to the inside of
the funnels with a square rod passing through a socket in the damper and
that part which rests upon the funnel is made round so as easily to turn and
a nut and screw is fitted upon one end and a bow upon the other, that part
of the rod next the bow being square. I then place the damper into the funnel
and pass the rod through holes in the funnel, and through the socket of the ~~da~~
damper, and put the nut on to the opposite end, confining the damper in
the required position by a square mortice in the side of the funnell fitted to
receive the square rod by which the damper is made fast when required
and by which I can change the heat from one end to the other of the stove
and throw it backward and forward from the front to the back funnels.
I then make an oven as follows to be connected with the stove. first I make an
oblong square box of sheet iron of any required length and width suitable
for the stove which is called the outside case the front of which is covered
in part with a plate of sheet iron about the length of the stove plate form-
ing a projection for fastening and leaving a square oblong opening to
receive receive the oven. and in the underside are conducting flues corresponding with
those in the back part of the stove plate aforesaid there is also a flue or flues
in the top of the case to let out the smoke with a damper. I then make an oven
of the same figure and smaller than the outside case with a plate connected to
it in front the same as the case leaving an opening for the door. I next make
and hang a door in common form. I then set the oven into the case with
the projection in front fitting over and shutting snug to the case, and I make
the oven fast to the case by a nut and screw in the backside leaving a space
all around it excepting the front for the passage of the heat and I have par-
titions of iron fitted between the case and oven to throw the heat equally
into every part. A shelf or grate is used in the oven as in common stove ovens.
When required I make the whole oven of cast iron, having thus finished
my stove and oven I next place my stove into the fire place, the back part
resting on a projection of mason work. or fitted into a grooving with the
finished front part projecting outward on the hearth as at A. I construct
the box when required by building up in part of mason work at the ends.
I then place the oven case & oven under the mantle of the fire place the
back part resting upon mason work and the front resting upon the top of
the back funnels to which it is fitted with the case so fitted to the mason
work as to leave a space around the ends and backside for the passage of the
steam as at C. and screw the case to the jambs or coverings of the fire place
by which it is made fast and may be rendered moveable, and the oven may
also be removed from the case by turning the screw which confines it to the
back of the case. A space is left between the top plate and the bottom of
the oven so that the boilers may set in part under the oven and the more
conveniently to let off the steam from the boiler. And in the back part of
of this space a small fire place is constructed between the back flues
when required as at f. in No. 1. What I claim as my improvement and
not previously known in the above described stove is the particular arrange-
ment & effect of the flues. funnels, dampers & oven and the appendages for
letting off the steam. And the application of the whole to the common open fire
place as before described. Allegations. In fire places where the oven cannot be
let into the chimney of sufficient depth. it may be projected wholly or in
part

8884X part and the stove in the same proportion and in this case a mantle of the width
of the projection either of mason work or of iron may be placed horizontally over
the oven case resting upon the top of the covings of mason work leaving a space
between the oven case and the mantle for the passage of the smoke. I contemplate
in some case fitting an oven of cast iron at one or both ends of this stove and
when I use it for sitting rooms and parlours I leave out the oven and the places
for boiler. And when I use this stove without the oven the back funnel en-
ter a false back at right angles or enters upwards into a plate fitted into the
throat of the chimney; And in small stoves only one back or front funnel is
used. Sandwich N. H. May 2nd 1835.

Witness

Warren Dearborn

James Hoag

Elijah Skinner (Drawing)

1590 [illegible]